United States Patent [19]
Sohlberg

[11] 3,799,045
[45] Mar. 26, 1974

[54] METHOD OF AIR CONDITIONING
[75] Inventor: Jan Sohlberg, Vallentuna, Sweden
[73] Assignee: Carl Georg Munters, Stocksund, Sweden
[22] Filed: Apr. 28, 1972
[21] Appl. No.: 248,684

Related U.S. Application Data
[63] Continuation-in-part of Ser. No. 866,282, Oct. 14, 1969, abandoned.

[30] Foreign Application Priority Data
Oct. 16, 1968 Sweden.............................. 13991/68

[52] U.S. Cl......................... 98/32, 98/115 K, 165/7
[51] Int. Cl.............................................. F24f 3/16
[58] Field of Search .......... 55/74, 387, 473; 98/115, 98/32, 33 R; 165/59, 7, 66

[56] References Cited
UNITED STATES PATENTS
| 3,125,157 | 3/1964 | Munters et al. | 165/7 |
| 3,706,182 | 12/1972 | Sargent | 55/387 X |
| 3,125,869 | 3/1964 | Winton | 62/317 |

Primary Examiner—William E. Wayner
Attorney, Agent, or Firm—Eric Y. Munson

[57] ABSTRACT

Method of air conditioning a group of enclosures, including a group containing contaminated or malodorous air, by passing the contaminated air through a carbon filter in the outgoing air passage of the air conditioning system and then through a regenerative exchanger in heat and moisture exchange relationship with the fresh air being passed through the exchanger in an incoming passage into the enclosures.

2 Claims, 2 Drawing Figures

PATENTED MAR 26 1974　　　　　　　　　　　　　　3,799,045

METHOD OF AIR CONDITIONING

This application is a continuation-in-part application of U.S. Pat. application Ser. No. 866,282 filed Oct. 14, 1969, now abandoned.

BACKGROUND OF THE INVENTION

This invention relates to a method of air conditioning a group of enclosures including a group containing contaminated or odor laden air, particularly kitchens, in dwellings.

It is well recognized that activated carbon or charcoal filters have been used in ventilating systems for removing foul odors from homes and kitchens, refrigerators, food storage chambers and other enclosures. The activated carbon or charcoal filter is usually placed at random in the circulating air stream, which vents the indoor air to the outdoors. Such ventilating systems minimize uncomfortable drafts and reduce heat losses during periods when indoor heating is required.

An activated carbon or charcoal filter has a capacity for adsorbing most of the foul odors including kitchen odors resulting from preparation and cooking of food. However, the effectiveness of activated carbon or charcoal filters last only for a relatively short period of time, and when they become saturated they start to emit other malodorous effluents into the ambient air. This is probably due to the adsorbed odor producing substances becoming decomposed into gaseous or fluid substances, which the activated carbon no longer can retain. This problem is noticeable even if a separate filtering element, such as mineral wool is used in combination with the activated carbon filter for extracting the vaporized grease and other particles before the gases and the heat from the kitchen range reach the carbon filter. Therefore, carbon filters have not heretofore found any practical applications for the purification and recovery of the air in kitchens similar enclosures, when the saturated carbon filter is apt to emit foul smelling effluents into the ambient air.

The object of the invention is to provide a method for purifying and conditioning the air in dwellings, which include a kitchen or similar enclosure for the preparation of food, which will prevent malodorous effluents from being emitted from the carbon filter into the kitchen or other dwelling rooms. This object is achieved by passing the malodorous air stream after having passed through the carbon filter through a regenerative heat and moisture exchanger which rotates between the outgoing passage and the passage for the incoming fresh air stream into which latter stream the heat and moisture content of the outgoing air stream is transferred prior to the latter's discharge to the outdoors.

By means of a regenerative heat and moisture exchanger of the type shown in U.S. Pat. No. 3,125,157, a substantial portion of the heat of outgoing room air, which may amount to 80 percent and more, may be recovered by the incoming fresh air stream. A simultaneous moisture exchange between the two air streams ensures a satisfactory humidity level of the room air in the dwelling.

As will be noted from U.S. Pat. No. 3,125,157, the heat and moisture exchanger comprises a rotor composed of a corrugated web of cellulosic material, such a paper, which may be treated with a hygroscopic substance. This web is wound in the form of a spiral about a hub, and defines a maze of passages extending through the rotor, which in one sector of the rotor is passed by the outgoing stream room air and in the other sector by the incoming fresh air stream. The web is preferably made of asbestos paper, which may be made in accordance with U.S. Pat. No. 3,231,409.

It might well be assumed that an exchanger of the aforementioned type should be satisfactory for the adequate ventilation of a kitchen and the like, since the outgoing air stream carries along with it the cooking odors. It was discovered, however, that some of the odor producing substances became adsorbed by the rotor and were transferred to the incoming fresh air stream. Thus, the incoming air became contaminated to a non-acceptable degree. This problem has been solved by placing the carbon filter in advance of the exchanger rotor in the direction of the outgoing air, which, apparently, regenerates and reactivates the odor adsorbing characteristics of the carbon filter as the incoming fresh air was found to be free from any admixture or contamination with such odors.

SUMMARY

The concept underlying applicant's invention is that by locating the filter in the path of the air stream escaping from the kitchen and intermediate the latter and the exchanger, it unexpectedly serves to create the conditions for the described transfer of the malodors, owing to the fact that the exchanger contains wet surfaces, i.e., the surfaces of the web which are wetted by the exchange of moisture which occurs in the exchanger.

At that location the outgoing air carries a maximum content of the substances which constitute the cooking odors. Thus, that location of the filter would be expected to be less effective for removal of the odors than when the filter is located in the path of the entering fresh air at a point after the latter has passed through the exchanger fill. However, contrariwise and unexpectedly, when located in advance of the regenerative heat exchanger in the direction of the outgoing air, the incoming fresh air surprisingly remains totally free from admixture with odors from the outgoing air stream.

The explanation for the aforementioned surprising and unexpected effect resides in the fact that the substances thus leaving the filter are apparently of a character such that they are not adsorbed by the exchanger fill to an appreciable extent, but instead move directly through the same without becoming transferred to the incoming fresh air.

Although the carbon filter adsorbs odorants developing in and which escape from the kitchen, it begins, after a relatively short period of time, to discharge or emit a variety of ill-smelling substances. Applicant has discovered that these substances are of a character such as not to be adsorbed by the moisture adsorbing substance of the heat and moisture exchanger, but rather pass right through the exchanger body to the ambient atmosphere. Thus, the exchanger operates to transfer heat and moisture between the incoming and outgoing air streams, without carrying over the odors to the incoming air. This is altogether contrary and opposed to the situation where the odorants from the kitchen pass directly out to the exchanger, i.e., without the filter being located in that path. In the latter instance, the exchanger operates also as a transferrer of the odors from the outgoing to the incoming air streams.

In the system according to the invention, the odorants are unexpectedly transformed into what may be termed an impotent, or inactive or indifferent condition, i.e., one wherein, although they are of disagreeable character, they do not affect the incoming side of the exchanger.

PREFERRED EMBODIMENTS

Figure 1:
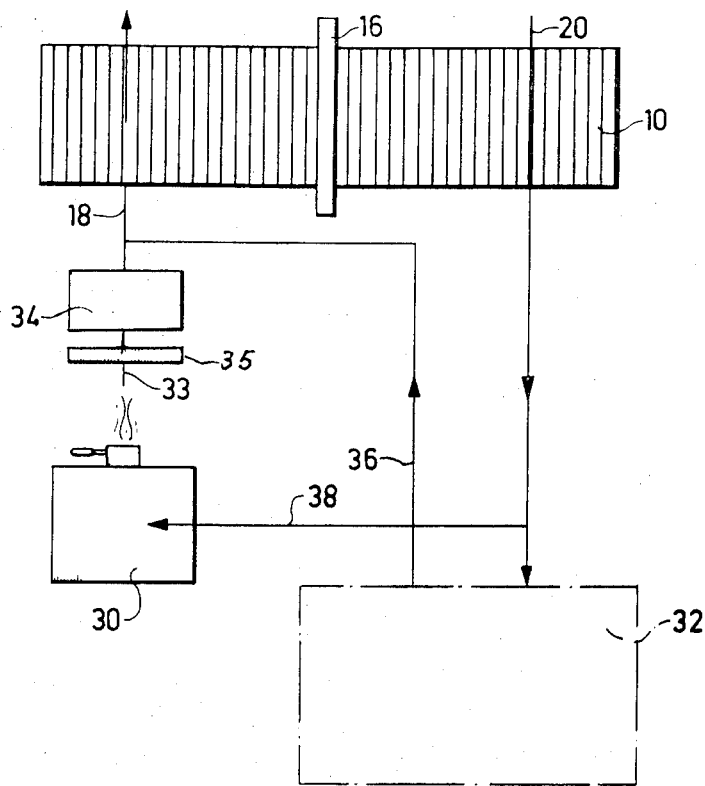
FIG. 1 is a diagrammatic representation of a ventilation device embodying the invention.
Figure 2:
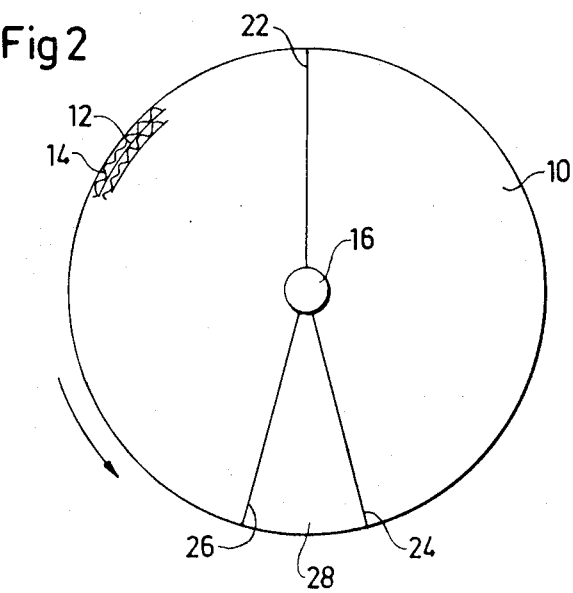
FIG. 2 is a lateral view of an exchanger fill forming part of the device shown in FIG. 1.

Referring to the drawing, reference numeral 10 denotes an exchanger fill which, according to a particular advantageous embodiment, is composed of alternately plane layers or sheets 12 and corrugated layers or sheets 14 of thin asbestos paper, the spacing between the plane layers being less than 3 millimeters and preferably about 1.5 millimeters. The layers or sheets are impregnated with a hygroscopic substance such as lithium chloride so that the exchanger fill simultaneously transfers heat and moisture. In other respects it may have the structure described in the patent specification referred to above. The exchanger fill is mounted on a shaft 16 and rotates in a casing between two channels which form passageways for the two air streams, viz. one passageway for an outgoing air stream 18 from the dwelling rooms and an incoming fresh air stream 20 from the ambient atmosphere. The exchanger fill is divided by partition walls 22, 24, 26 into sectors or zones, of which a smaller sector 28 constitutes a recovery or scavenging zone of a kind know per se. This sector is passed by a stream of fresh air which is fed directly into the outgoing stream 18 for the consumed air. Hereby evacuation air present in the channels of the fill is removed before fresh air is introduced into the various rooms of the dwelling house.

Reference numeral 30 in FIG. 1 designates a kitchen which term is understood to have the general meaning of one or several rooms or compartments in which preparation of food takes place. Other rooms or compartments in the house which are connected to the same ventilation system indicated by the broken line 32. The dwelling house may be composed of a plurality of apartment units each of which has a kitchen 30 and one or several other compartments 32. In the embodiment shown, an activated carbon filter 34 of known kind, is provided in the path of the air stream 33 escaping from the kitchen. This filter is passed by the air from several kitchens before this air passes to the exchanger fill 10. The consumed air escaping from the other rooms 32 is, in the exemplified embodiment, fed into the air stream 16 through a duct system 36 at a place beyond the charcoal filter 34. The incoming fresh air from the atmosphere is fed as indicated by the line 30 partly to the rooms 32 and partly through a branch duct 38 to the kitchen 30. Of course, the kitchens may also be supplied with fresh air through the rooms 32. The heat exchanger 10 with the charcoal filter 34 may be located on the roof or the loft of a house.

Vaporized grease particles from the kitchen range have a tendency to collect and condense on the carbon filter, which will have a deletereous effect upon its odor adsorption qualities. A grease filter 35 is, therefore, provided in the passage 18 at a slightly spaced distance from the carbon filter 34.

As will be seen from FIG. 1, the total air escaping from the kitchen 30 will pass through the charcoal filter 34 which, therefore, has to adsorb relatively great quantities of substances containing cooking odors. The charcoal filter has an extra-ordinarily high adsorption capacity and removes the main portion of the odorants so that possible remainders have so low a concentration that such transfer of them as takes place in the exchanger remains below the threshold value above which odor becomes perceptible. However, the adsorbed substances appear to be decomposed after some time, so that the charcoal filter delivers gases or volatile substances of other character than the adsorbed substances. These gases which in themselves have an unpleasant odor when they are discharged from the filter, now pass through the exchanger fill together with the air stream without becoming adsorbed by the fill to an appreciable degree. For this reason, the incoming air stream 20 will remain totally free from any admixture of odor. It is obvious that the filter 34 must be replaced at suitable intervals so that the absorbing function of the device is retained.

The invention may be also used in connection with regenerative exchangers of the type which in themselves are not hygroscopic but have as their main function to transfer heat between the streaming media. Under certain conditions, especially during the cold season, there will occur in such exchangers a condensation of moisture, whereby conditions are created for transfer of malodors of the kind described hereinbefore as resulting from the fact that the exchanger contains wetted surfaces.

Neither is the application of the invention limited to systems with separate evacuation of kitchens. It is also conceivable to locate the filter in such a position that it is passed by all evacuated air.

It is also conceivable that similar problems with transfer of odor may arise in other connections than with preparation of food, such as in provision-dealer's shops, refrigerating chambers, holds where nutritives or food stuff emit especially organic odorous substances into the air which substances must be neutralized.

It is further possible to utilize the invention in connection with space in which the odorants are produced and which is supplied with ambient air which has not been preheated in the regenerative exchanger. Such may be the case if, in the space in consideration, a great excess of heat is developed which is to be utilized for the heating of other spaces.

It should be understood that the above description is given by way of example and not by way of limitation and the inventive concept disclosed herein may find a variety of expressions within the scope of the appended claims.

What is claimed:

1. The method of air conditioning a group of enclosures including a separate enclosure containing malodorous air comprising the steps of:

a. passing a stream of fresh air into said enclosures through a regenerative heat and moisture exchanger in an incoming air passage;

b. passing a stream of malodorous air from said separate enclosure through a carbon filter, in an outgoing air passage;
c. passing said stream of malodorous air from said carbon filter through said regenerative heat and moisture exchanger, and
d. passing consumed air from the group of enclosures other than said separate enclosure directly into the outgoing air passage at a location between the carbon filter and the heat and moisture exchanger.

2. The method according to claim 1, in which fresh incoming air is passed separately into said separate enclosure.

* * * * *